March 28, 1950 P. W. MARTIN 2,501,953
ELECTRICAL WELL LOGGING SYSTEM
Filed May 22, 1945 2 Sheets-Sheet 1
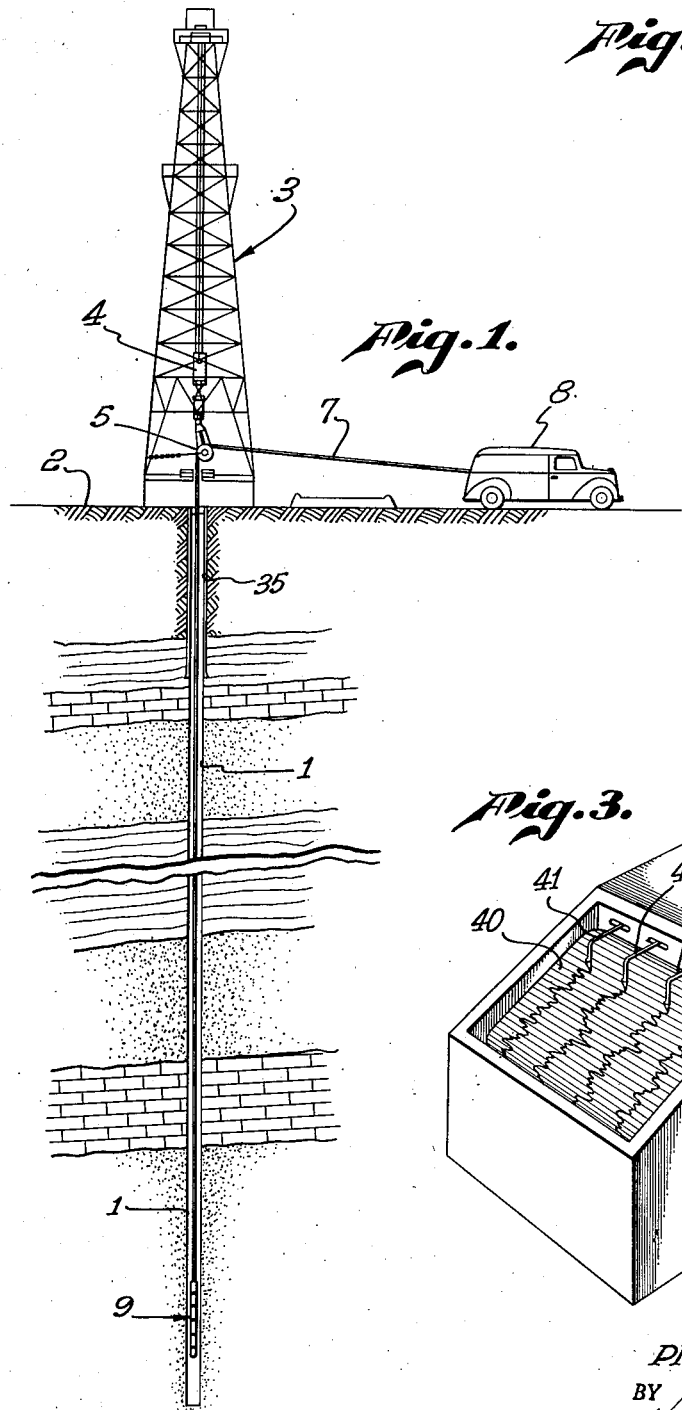
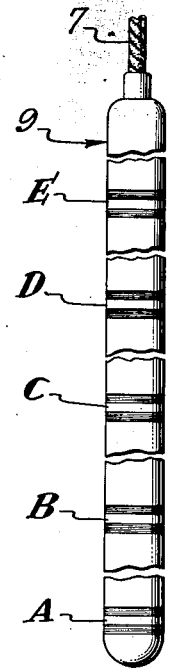
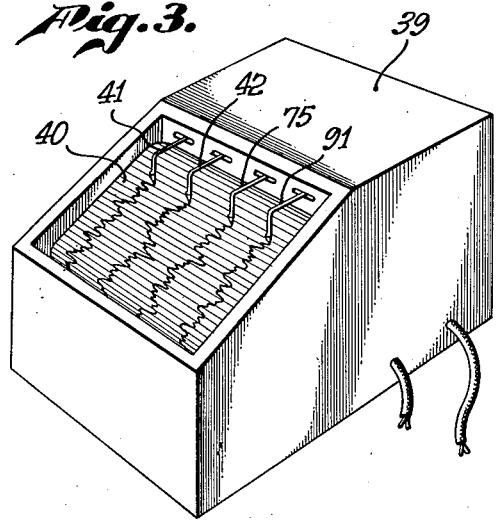
INVENTOR.
PHILIP W. MARTIN,
BY
ATTORNEY March 28, 1950     P. W. MARTIN     2,501,953
ELECTRICAL WELL LOGGING SYSTEM
Filed May 22, 1945     2 Sheets-Sheet 2

PHILIP W. MARTIN,
INVENTOR.

BY
ATTORNEY

Patented Mar. 28, 1950

2,501,953

UNITED STATES PATENT OFFICE 2,501,953

ELECTRICAL WELL LOGGING SYSTEM

Philip W. Martin, Huntington Park, Calif.

Application May 22, 1945, Serial No. 595,213

3 Claims. (Cl. 175—182)

My invention relates to systems for measuring physical values at a point remote from a receiving and translating station which is adapted to receive, segregate and translate the different values so measured, and has particular reference to a system for transmitting over a single conductor a plurality of electrical potentials which will be modified by the physical values measured at the remote location and be transmitted back over the same conductor to the receiving and translating station as segregatable modifications of the original potentials.

One typical example of the use to which my invention may be applied is in the surveying of deep wells such as oil wells wherein it is desired to measure various physical characteristics of the earth bore such as, for example, electrical logging of wells, measurements of temperature gradients, pressures or other characteristics of the well which are desired to be ascertained.

In previous instruments accepted by the trade as having any commercial value for the electrical logging of oil wells and in which the measurements made by the instrument were transmitted to the ground surface by means of electrical conductors, it has been either necessary to employ a plurality of electrical conductors associated with a plurality of measuring instruments or to use a single conductor for supporting a single measuring instrument adapted to measure one physical value such as temperature, pressure or the like, and if other values are to be measured it is necessary to withdraw the electrical conductor and the initial instrument, substitute another instrument and make a second run down in the well for the purpose of measuring this new set of values.

In some previous instruments, such as employed in the electrical logging of wells, it has been attempted to make simultaneous measurements in the well of natural earth potentials, resistivity in a small area immediately surrounding the measuring instrument and two or more additional resistivity measurements in areas of progressively increasing penetration into the earth formations surrounding the measuring instrument, such instrument being suspended upon an electrical cable having a separate conductor for each of the values to be measured so that a single passing of the instrument down into the well might be used to produce the registration or recording of the several values simultaneously. Due to the fact that a multi-conductor cable must be used, considerable difficulty is encountered due to insulation failures between the several conductors and in addition the multi-conductor cable has the disadvantage of being bulky and of great weight, making it difficult to manipulate.

It is therefore an object of my invention to provide a system of electrically measuring a plurality of physical values at a point remote from a recording station by interconnecting the recording station and the remote location by a single electrical conductor and a return path defined either by a second conductor or an earth return path, and in which a plurality of measurements made at the remote location may be transmitted to the recording station as modifications of electrical potentials which may be segregated and individually recorded at the recording station.

Another object of my invention is to provide a system as set forth in the preceding paragraph particularly adapted to the measurement of different physical values in a deep well or earth bore wherein an exploration instrument having a plurality of measuring devices for measuring a plurality of different values is suspended upon a single electrical conductor or a single electrical conductor and a surrounding metallic sheath and wherein the several different values measured by the individual measuring instruments may be transmitted simultaneously through the single conductor and earth return or the conductor and sheath to the ground surface where the different measurements may be segregated and individually registered or recorded.

In order that my invention may be more readily understood, I have illustrated the adaptation thereof to the electrical logging of oil wells wherein it is desired to simultaneously measure natural earth potentials and the resistivity to the passage of electric current through areas of the earth bore formation surrounding the exploration instrument at a plurality of different depths of penetration into the surrounding earth formations though it will be understood that the same system and the principles of my invention may be readily applied to other types of measurements such as the measurements of temperature, pressure, angle of inclination of the bore and many other physical characteristics of a well which are desired to be measured.

Hence other objects and advantages of my invention will be apparent from a study of the following specifications, read in connection with the accompanying drawings, wherein Fig. 1 is a diagrammatic view of an oil well bore illustrating the manner in which my exploration instrument may be employed for electrical exploration of the well;

Fig. 2 is an elevational view of the exploration instrument per se and illustrating the distribution of the various electrodes along the length thereof;

Fig. 3 is a perspective view of a multiple recording instrument which may be employed to record the values measured by my exploration instrument;

Figure 4:
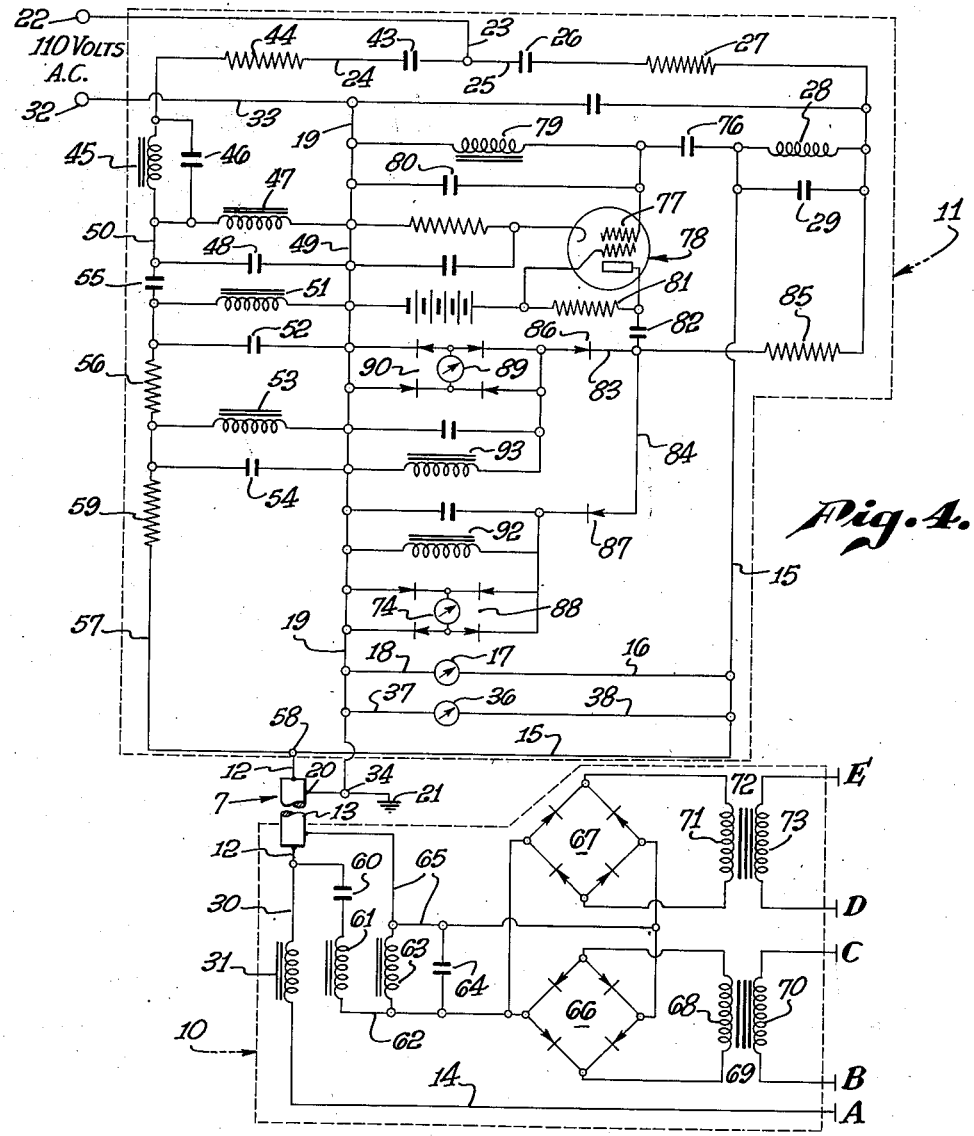
Fig. 4 is a diagrammatic view of an electrical wiring system which may be employed as a part of my exploration instrument.

Referring to the drawings, I have illustrated in Fig. 1 a typical well bore 1 which passes from the ground surface 2 downwardly past a plurality of different formation structures distinguished from each other in the drawing by various types of shading. Above the well bore is illustrated a typical derrick 3 having hoisting equipment 4 upon which is suspended a wheel or pulley 5, over which an electrical conductor cable 7 extends from a hoisting device (not shown) located within a vehicle such as a truck 8 and in which truck may be located the ground surface equipment required for the practice of my invention.

Suspended upon the cable 7 is the exploration unit 9 which may comprise a water-tight housing containing electrical apparatus to be more fully hereinafter described connected to a plurality of electrodes A, B, C, D and E exposed at intervals along the longitudinal length of the unit 9 for contact with the well fluid (mud, water, oil, etc. in the well bore).

In Fig. 4 I have illustrated within the dotted lines 10 certain electrical apparatus which will be carried within the unit 9 while within the dashed lines 11 I have illustrated the electrical apparatus which will be required at the ground surface, the two sets of electrical apparatus being illustrated as interconnected by means of the cable 7, which cable comprises an inner metallic electrical conductor 12 surrounded by insulation and the whole enclosed within a metallic sheath 13 which, as will be hereinafter described, may comprise a second electrical conductor employed in my instrument as a return circuit.

In Fig. 4 I have diagrammatically indicated the annular electrodes A, B, C, D, and E as short vertical lines connected to electrical conductors which pass into the interior of the housing defined by the unit 9.

The lowermost of the electrodes, electrode A, is shown as being connected by means of a conductor 14 to the central metallic conductor 12 of the cable 7, the end of the conductor 12 located at the ground surface being connected to a conductor 15 which is in turn connected by means of a conductor 16 to one terminal of a meter 17, the opposite terminal of which is connected by means of conductors 18 and 19 to the metallic sheath 13 as indicated at 20, the metallic sheath being also grounded as indicated at 21. Thus the electrode A may be employed to measure the natural or earth potentials, such potentials actuating the meter 17 to cause the meter to assume varying positions as the natural or earth potentials vary as the unit 9 passes different formation structures on its way down into the well bore.

Since the variations of the potentials to be registered by the instrument 17 are extremely small, the meter 17 is preferably a voltmeter capable of measuring millivolts and should be selected to respond only to direct current potentials and to ignore alternating currents. Thus the meter 17 will register the earth potentials as distinguished from other potentials which may be applied to the circuit.

For the purpose of measuring the resistivity of a spherical area immediately adjacent the electrode A, I apply between the conductor 12 and ground an alternating current potential from any suitable source. Such source, for convenience of understanding the following explanation, may be considered as a 50-cycle, 110-volt commercial supply line indicated by the legend 110-v. A. C. The current from such source is applied from one terminal 22 through a conductor 23 to a pair of circuit branches 24 and 25, the branch 25 extending through a block condenser 26, the resistance 27, a choke impedance 28 with a condenser 29 shunted across it; thence the circuit extends by way of conductor 15 to conductor 12 and down the well to the exploring unit 9, the circuit continuing by way of conductor 30 and choke 31 to conductor 14 and thence to the electrode A. The other terminal 32 of the alternating current supply source is connected by means of conductors 33 and 19 which are in turn connected, as indicated at 34, to the ground 21. For convenience, this ground connection may be made at or near the ground surface as by connecting a ground conductor to a length of pipe or casing 35 (see Fig. 1) which extends down any considerable distance into the well bore though it will be understood that any suitable grounded conductor may be employed. Condenser 26 and resistor 27 serve among other things to maintain a substantially constant current through the circuit leading from the terminals 22 and 32.

The 110-v. A. C. supplied to the circuit will place a potential between the electrode A and ground, the current value of which will be determined by the impedance effects of the resistance 27 and the choke 28, and the resistivity of the mud fluid surrounding the exploration unit 9 and the immediate surrounding portions of the earth formation adjacent the electrode A. The potential thus applied will be measured by a second meter 36 connected by means of conductors 37 and 38 across the conductors 15 and 19 in parallel relation with the meter 17. The meter 36 may be a voltmeter or milliammeter adapted to register alternating current potentials and to ignore direct current potentials.

Thus with the single electrode A, I am able to explore the depth of a well to produce registrations of the varying natural potentials existing in the well and the surrounding formations as the exploration unit 9 passes the different formation structures on its way down into the well bore while at the same time I measure the resistivity of a spherical area of relatively short radius surrounding the electrode A as a center. Such measurements may be either read and manually recorded or the instruments 17 and 36 may be of the recording type adapted to automatically record the measurements upon a record strip or record disk.

One type of recorder is illustrated in Fig. 3 as comprising a suitable housing 39 in which a strip of paper or other similar recording material 40 is driven longitudinally past a recording pen 41 at a rate of speed synchronized with the rate at which the exploration unit 9 is lowered into or drawn out of the well, the recording pen 41 being actuated by the meter 17 to draw a line or curve upon the chart 40 representing the earth potential values and their fluctuation. The chart 40 also passes beneath another recording pen 42 which may be connected to or actuated by the meter 36 so that a simultaneous recording of the resistivity immediately adjacent the electrode A may be made.

As thus far described, two distinct recordings of two distinct values are obtained by using a single conductor 12 extending down into the well. Such single conductor, however, is also employed to measure additional values and to transmit them to the ground surface where they may be segregated from the currents affecting the meters 17 and 36 as by supplying another potential between the conductor 12 and ground of a considerably different frequency from the 50-cycle commercial frequency. For example, I may apply a frequency of 500 cycles by utilizing a shock-excited oscillator in the circuit shown in Fig. 4, wherein the 50-cycle alternating current which is applied to the circuit extends through the branch circuit 24, condenser 43, resistor 44, and choke 45 which has a condenser 46 shunted across it. The resistor 44 and condenser 43 limit current drawn by this branch circuit and in addition may be adjusted to obtain any phase relationship of the 50-cycle current which may be required for synchronization as will later appear. The choke 45 and condenser 46 together serve as a 500-cycle infinite impedance filter to prevent the 500 cycles generated by the oscillator from being shorted out through the 50-cycle, 110-volt A. C. supply. The 50-cycle voltage which is passed through this filter is supplied across a choke 47.

The core of the choke 47 is preferably made of $M\mu$ metal which has a very high permeability at low flux densities but saturates at relatively low magnetizations. Due to the saturation of the choke, the back E. M. F. distorts the wave-form of the 50-cycle current which may be represented by a 50-cycle fundamental and an infinite series of harmonics thereof, including a 500-cycle harmonic. A condenser 48 shunted across the choke 47 serves to parallel tune this section of the circuit. As measured from conductors 49 and 50, the parallel arrangement of choke 47 and condenser 48 presents an infinite impedance at 500 cycles so that the circulating currents produce considerable voltages across both the condenser 48 and the choke 47. Choke and condenser combinations 51—52 and 53—54 comprise 500-cycle filters for draining off any 50-cycle which passes through a coupling condenser 55, the two filter sections being coupled by a resistance 56 and to a conductor 57 which connects, at the point indicated at 58, with the conductor 15 and the conductor 12 which extends down into the well. A resistance 59 is interposed in series relation with the conductor 57 and is a dropping resistance having a value chosen to provide on conductor 57 a 500-cycle frequency having an effective voltage of approximately 0.4 This voltage is thus passed down through the cable 7 and into the exploration unit 9 where the 500-cycle potential is blocked from conductor 14 by the choke coil 31.

A condenser 60 and a choke 61 are connected in series and to the conductor 30; the condenser and choke 60—61, being resonated at 500 cycles, offer substantially no impedance to the passage of the 500-cycle current but offer a relatively high impedance to the passage of 50-cycle. Any 50-cycle which would appear at the conductor 62 is drained off to ground through a filter which comprises a choke 63 and condenser 64 connected to ground by means of conductor 65, the filter being resonated at 500 cycles to present a very high impedance to that frequency.

In the exploration instrument, I provide two ring modulators 66 and 67 each comprising a bridge of four copper oxide rectifiers which are preferably enclosed in vacuum bottles to render them substantially independent in their operation of any temperature variations which may exist in a well under exploration, and particularly to render them impervious to the high temperatures usually encountered in wells of great depth. The ring modulator 66 has one pair of its corners connected across conductors 62 and 65, as is also one pair of corners of the modulator 67 so that the 500-cycle current is applied to both of these modulators. Connected across the opposite corners of the modulator 66 is one coil 68 of a transformer 69, the other coil 70 of which has its terminals connected to the electrodes B and C. Similarly, the ring modulator 67 is coupled to a coil 71 of a transformer 72, the other coil 73 of which has its terminals connected to the electrodes D and E.

It will be noted that the ring modulator 66 is inverted with respect to the ring modulator 67 so that at a given instant when the electrode B is negative and electrode C is positive, electrode D will be negative and electrode E will be positive. Thus any 50-cycle potential picked up in the well by the electrodes B and C will reflect across the modulator 66 with a polarity which will pass through the modulator 66 and appear across the terminals 62-65 as a 50-cycle modulation of the 500 cycle.

At this same instant, however, the 50-cycle potentials picked up by D and E will be reflected across the modulator 67 but with a polarity such that it cannot pass through the modulator 67 and hence will not appear across the conductors 62 and 65. Thus during one half cycle of the 50 cycles the ring modulator 66 will apply through the modulator 66 a modulated frequency to the conductors 62 and 65, the current value of which is a function of the resistivity of the formation about the electrodes B and C, the zone of the sphere thus measured being defined by the electrode A as a center and the distance between electrodes A—B and A—C as radii.

During this half cycle no current will be passed by the modulator 67 and hence, by providing at the ground surface a pick-up which will take off this measured resistivity factor and apply it to an indicating instrument or voltmeter 74, a curve denoting the resistivity of the zone defined by the electrodes A—B—C may be noted and may be recorded by utilizing as a part of the instrument 74 a pen 75 adapted to draw a curve on the chart 40 representative of these values.

During the next half cycle of the 50 cycles, the relation of the polarities of the electrodes A, D, and E is such that an electrical current value representative of the resistivity of a zone of still deeper penetration will appear across the modulator 67 and across the conductors 62 and 65 at a time when the polarity relations between electrodes A—B—C is such that the modulator 66 will pass no current. Thus the resistivity of the zone of still deeper penetration is measured and translated during the other half cycle of the 50 cycles. The zone so measured is a hollow spherical zone about A as a center and with the distance between the electrodes A—D and A—E as radii.

The segregation of the two sets of additional values thus measured may be accomplished as follows: Since each of these values appear across the conductors 62 and 65, these values are applied between conductor 12 and ground and appear also between conductors 19 and 15, from which the potentials are applied through a condenser 76 to the grid 77 of a vacuum tube amplifier 78. The grid return through choke 79 and condenser 80 serves to drain off any 50-cycle that passes the condenser 76 and maintains the 500-cycle voltage on the grid of the tube 78.

The amplified 500-cycle output appears across plate resistance 81 and is coupled through blocking condenser 82 to conductors 83 and 84. These conductors are connected also to the 50-cycle source of current through a resistance 85. The resistor 27 and condenser 26 are adjusted relative to each other to establish an in-phase condition between the 50-cycle coupled through the resistance 85 and the 50-cycle modulation which has been applied to the 500-cycle through the condenser 82. The 50-cycle is thus applied across oppositely directed rectifiers 86 and 87.

By reason of the rectifiers 86 and 87, one half of the 50-cycle wave, which for convenience may be called the positive half cycle, will pass through the rectifier 87 while it will be blocked by the rectifier 86. This half cycle will therefore be applied across a rectifier bridge circuit indicated at 88 to affect the meter 74. This meter, it will be recalled, is associated with the electrodes B and C to register the resistivity and to draw the curve by the pen 75.

During the other half cycle, or negative half cycle, the amplified potentials will pass through the rectifier 86 but be blocked by the rectifier 87 and thus the potentials will be applied to a fourth meter 89 connected across a rectifier bridge circuit indicated at 90, the meter 89 preferably actuating a fourth pen 91 to draw a fourth curve representative of the values measured by the electrodes D and E which, it will be recalled, is effective during this negative half cycle.

Each of the meter circuits is preferably provided with a condenser-choke combination resonated at 500 cycles to apply the 500 cycles across the associated meter and to drain off any 50 cycles which may pass the rectifiers 86 and 87, the resonator associated with the meter 74 being indicated at 92 while that associated with the meter 89 is indicated generally by the reference character 93.

From the foregoing description it will be apparent that without requiring the addition of any conductors other than the single conductor 12 and its sheath 13, I am able to measure four different values at the same time with a single pass of an exploration unit 9 down into a well bore, these values being: first, the self potential or earth potential existing at various points along the course of the well bore; second, the resistivity of the zone immediately surrounding the lowermost of the electrodes A; third, the resistivity of deep penetration about the electrodes A, B and C; and fourth, the resistivity of a still deeper or greater penetration about the electrodes A, D and E, each of these measured values being passed to the ground surface over the same conductor 12 and sheath 13 to the ground surface where the four distinctly different values are segregated and applied, respectively, to four separate meters which may be employed to draw four simultaneous curves as the exploration unit passes down through the well bore.

It will also be noted that the apparatus which is required to be enclosed within the exploration unit is relatively simple and rugged, readily capable of withstanding any mechanical shocks to which the unit may be subjected on its passage down into the well bore, this apparatus consisting of choke coils, condensers, transformers and copper oxide rectifiers, none of which is readily injured or disturbed by mechanical vibration or shock.

Figure 5:
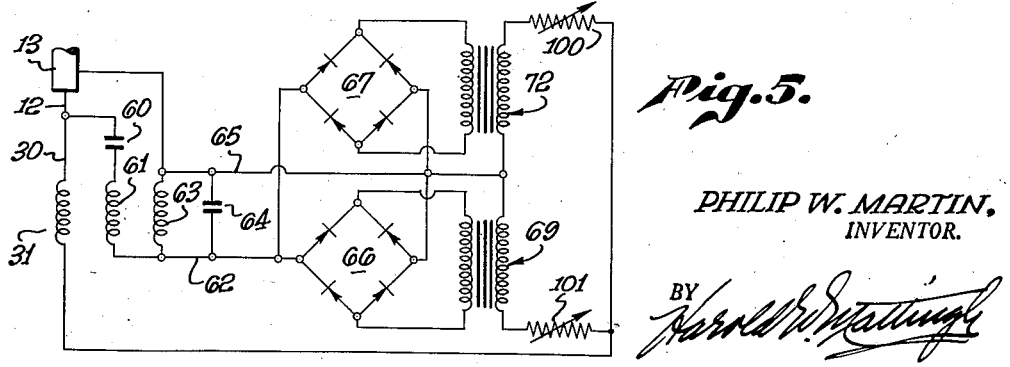
Fig. 5 is a fragmentary diagrammatic view of a modified wiring system which may be employed for the purpose of measuring different current values than those with which the diagram of Fig. 4 may be used.

While in the foregoing description I have demonstrated the application of my novel system to the measurement of resistivity values in earth bore exploration, it will be apparent that the ring modulator circuits are readily adapted for the measurements and transmission of other values as may be applied across the coils 70 and 73 of the transformers 69 and 72, respectively. In Fig. 5 I have illustrated a modification of the system shown in Fig. 4, wherein instead of connecting the coils 73 and 70 to electrodes D—E and B—C, respectively, these coils are illustrated as being connected to variable resistors 100 and 101, the variable resistors 100 and 101 representing any measuring and translating instruments the resistance of which will be varied in accordance with variations of a value measured by some measuring instrument such as a temperature measuring device or a pressure measuring device. Changes in the resistance values of the resistances 100 and 101 will be reflected, respectively, across the ring modulators 67 and 66, respectively, and the resistance changes so reflected will correspondingly affect the potential values transmitted back to the conductors 62 and 65 in the same manner as was described with reference to Fig. 4.

While I have in the foregoing description illustrated the manner in which two ring modulators may be employed to transmit two distinctly different sets of measurements by applying 500-cycle potential to the same conductor as carries the 50-cycle potential, it will be apparent that additional simultaneous transmission of measurements of additional values may be achieved as by applying other frequencies and employing additional modulator circuits tuned to these frequencies to place upon the conductor additional electrical values in terms of 50-cycle modulation of these additional frequencies.

It will also be apparent from the foregoing that while I have specifically described and illustrated my system as being applied to remote measurements of physical conditions in oil wells, the system may equally as well be applied to the transmission of a plurality of different sets of information between two remotely located stations wherein the information is placed upon the single conductor and return circuit in terms of modifications of the several potentials applied at one of the stations by the modifying values applied to the circuit at the other station by measuring and translating devices located at the remote station.

In the foregoing description I have referred to a "single conductor and a return circuit," but it will be apparent to those skilled in this art that the return circuit may comprise a ground return through earth or may be a metallic return conductor, either in the form of a second wire metallic conductor or in the form of the metallic sheath surrounding the conductor illustrated and described herein.

While I have shown and described the preferred embodiment of my invention, I do not desire to be limited to any of the details of construction shown and described herein, except as defined in the appended claims.

I claim:

1. In a system having a part lowerable into a well and connected with the surface by a circuit for obtaining information of conditions, the combination of: means at the surface of the ground for transmitting a lower frequency electrical current and a higher frequency electrical current through said circuit to the locality of the part in the well; modulator means carried by said part in the well responsive to two different conditions for utilizing said lower frequency current to modulate said higher frequency current in accordance with said conditions, said modulator means having a first portion responsive only to positive portions of a wave of said lower frequency current as modified by the first condition to be measured, and a second portion responsive only to negative portions of said wave as modified by the second condition to be measured; and means operatively connected to said circuit at the surface, said means operating in synchronism with said lower frequency current to segregate and separately indicate the respective values imposed on said higher frequency current by said modified positive and negative portions of said wave.

2. In a system having a part lowerable into a well and connected with the surface by a circuit for obtaining information of conditions, the combination of: means at the surface of the ground for transmitting a lower frequency electrical current and a higher frequency electrical current through said circuit to the locality of the part in the well; modulator means carried by said part in the well responsive to two different conditions for utilizing said lower frequency current to modulate said higher frequency current in accordance with said conditions, said modulator means having a first portion responsive only to positive portions of a wave of said lower frequency current as modified by the first condition to be measured, and a second portion responsive only to negative portions of said wave as modified by the second condition to be measured; means operatively connected to said circuit at the surface, said means operating in synchronism with said lower frequency current to segregate and separately indicate the respective values imposed on said higher frequency current by said modified positive and negative portions of said wave; electrode means carried by said part in the well connecting said circuit with the earth so as to apply earth potential to said circuit; and segregating and metering means connected to said circuit at the surface of the ground to indicate separately said earth potential.

3. In a system having a part lowerable into a well and connected with the surface by a circuit for obtaining information of conditions, the combination of: means at the surface of the ground for transmitting a lower frequency electrical current and a higher frequency electrical current through said circuit to the locality of the part in the well; modulator means carried by said part in the well responsive to two different conditions for utilizing said lower frequency current to modulate said higher frequency current in accordance with said conditions, said modulator means having a first portion responsive only to positive portions of a wave of said lower frequency current as modified by the first condition to be measured, and a second portion responsive only to negative portions of said wave as modified by the second condition to be measured; means operatively connected to said circuit at the surface, said means operating in synchronism with said lower frequency current to segregate and separately indicate the respective values imposed on said higher frequency current by said modified positive and negative portions of said wave; means for applying a direct current potential to said circuit representative of a third condition to be measured; and segregating and metering means connected to said circuit at the surface of the ground for separately indicating said direct current potential.

PHILIP W. MARTIN.

REFERENCES CITED

The following references are of record in the file of this patent:

UNITED STATES PATENTS

| Number | Name | Date |
| --- | --- | --- |
| 2,039,405 | Green | May 5, 1936 |
| 2,144,215 | Beverage | Jan. 17, 1939 |
| 2,298,794 | Howell | Oct. 13, 1942 |
| 2,357,177 | Doll | Aug. 29, 1944 |
| 2,357,178 | Doll | Aug. 29, 1944 |
| 2,368,532 | Fearon | Jan. 30, 1945 |
| 2,378,395 | Dickson | June 19, 1945 |
| 2,398,761 | Aiken | Apr. 23, 1946 |
| 2,415,364 | Mounce | Feb. 4, 1947 |